UNITED STATES PATENT OFFICE.

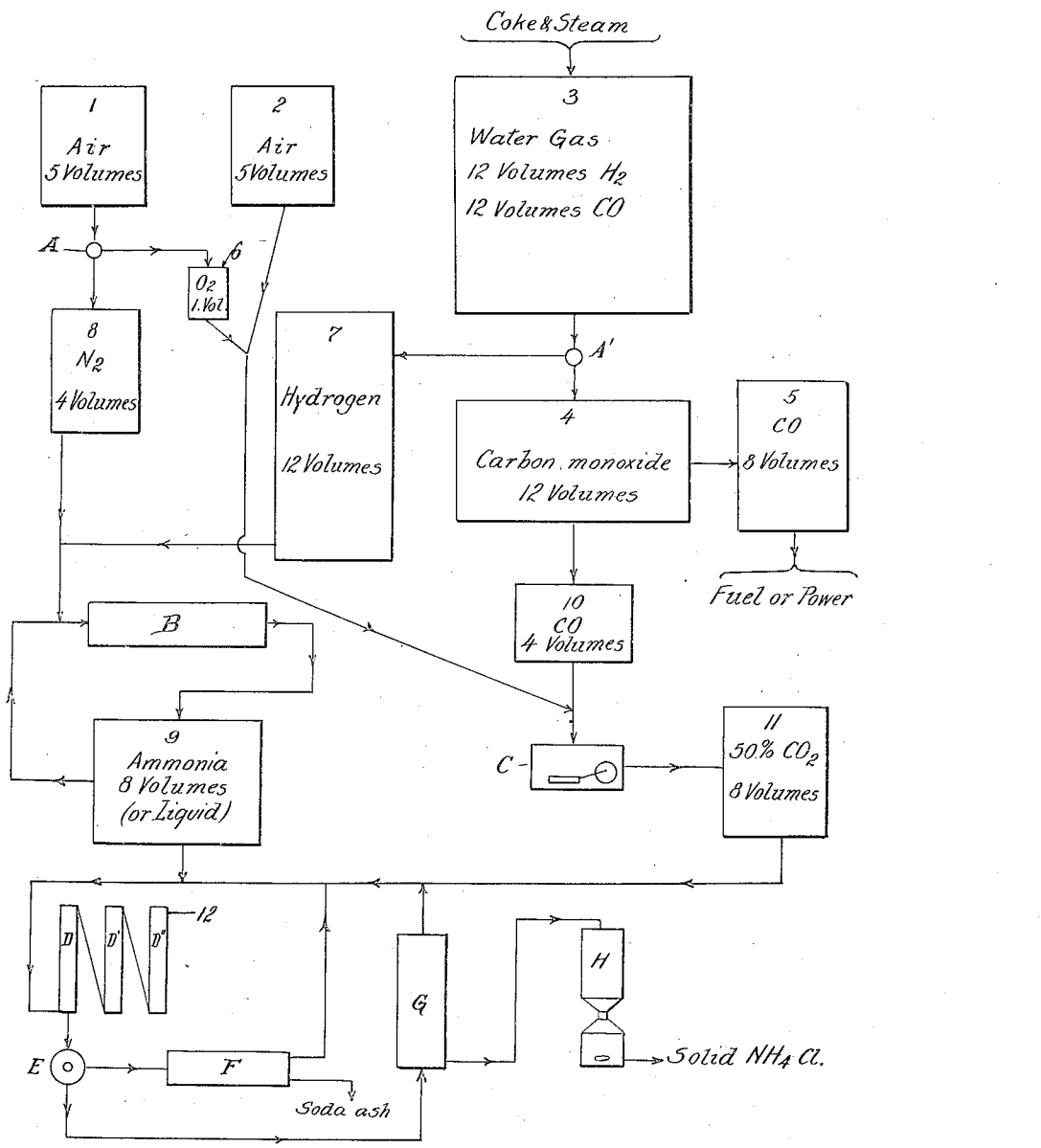

JAMES H. MacMAHON, OF SALTVILLE, VIRGINIA, ASSIGNOR TO THE METHIESON ALKALI WORKS, INC., OF NEW YORK, N. Y., A CORPORATION OF VIRGINIA.

AMMONIA-SODA PROCESS.

1,384,141.                Specification of Letters Patent.      Patented July 12, 1921.

Application filed August 18, 1920. Serial No. 404,403.

*To all whom it may concern:*

Be it known that I, JAMES H. MacMAHON, a citizen of the United States, residing at Saltville, in the county of Smyth, State of Virginia, have invented certain new and useful Improvements in Ammonia-Soda Processes; and I do hereby declare the following to be a full, clear, and exact description of the invention, such as will enable others skilled in the art to which it appertains to make and use the same.

This invention relates to improvements in the ammonia-soda process.

According to the present invention, the manufacture of bicarbonate of soda, according to the ammonia-soda process, is carried out in conjunction with the synthesis of ammonia, and with the production and utilization of high percentage carbon dioxid gases, and these operations are combined in a novel and advantageous manner.

In the ammonia-soda process, as commonly practised, a suitable ammoniacal brine, that is, a sodium chlorid brine nearly saturated with ammonia, is subjected to the action of carbon dioxid under pressure in towers of suitable construction. The carbon dioxid for the operation is commonly manufactured by burning limestone in kilns specially constructed for the recovery of the carbon dioxid evolved. The carbon dioxid from the limestone is, however, mixed with the gases from the combustion of the fuel together with some excess air and nitrogen, so that the concentration of the carbon dioxid in the kiln gases is commonly about 30 to 36%, and in practice may be as low as 25 to 28%. In using a carbonating gas containing such a relatively low percentage of carbon dioxid it is necessary to pass a large amount of the gaseous mixture through the carbonating towers in order to supply a sufficient amount of carbon dioxid thereto, and, since the concentration of ammonia in the ammoniacal brine is fairly high, the escaping gases carry away with them a considerable amount of uncombined ammonia. The loss of the ammonia with the escaping gases can be minimized by scrubbing the exit gases from the carbonating tower with fresh brine, but the large amount of escaping gases makes this recovery difficult. So also, in the carrying out of the carbonating process, the operation is ordinarily stopped while the reaction mixture contains an appreciable amount of free ammonia, amounting to as much as 3% or more, largely for the reason that the reaction with the carbon dioxid takes place very much slower as the concentration of ammonia reaches such small concentrations, and particularly where the gas employed for carbonating is itself relatively low in carbon dioxid.

According to the present invention, a gas richer in carbon dioxid is produced and supplied in the carrying out of the ammonia-soda process, so that the carbonating operation can be made considerably more complete in a given time, and with reduction in the amount of free ammonia remaining, while the more rapid absorption of the carbon dioxid in an apparatus of given size, due to the increased concentration of the carbon dioxid employed, results in greatly increased production. The use of a carbon dioxid gas of materially increased carbon dioxid content also materially decreases the total gas volume to be handled and to be passed through the absorbers and correspondingly reduces the volume of the escaping gases and the loss of ammonia escaping therewith. The production of the high concentration carbon dioxid gases, according to the present invention, is also effected in an improved and advantageous manner which makes unnecessary the provision of lime kilns for this purpose.

The production and utilization of the high concentration carbon dioxid gases, according to the present invention, is carried out in combination with the liquefaction and separation of air, and in combination with the manufacture and separation by liquefaction of water gas, as well as in combination with the production of synthetic ammonia, all as more fully hereinafter described and as claimed. The advantages and distinguishing features of the invention, certain of which have been above referred to, will more fully appear from the following more detailed description.

In the practice of the invention, atmospheric air is subjected to liquefaction and separated into its components, nitrogen and oxygen, or into substantially pure nitrogen and oxygen containing but a small proportion of nitrogen. The nitrogen thus produced is made use of in the synthetic production of ammonia and the resulting ammonia is supplied to the brine for the production of the ammoniacal brine of the ammonia-soda process. Water gas, produced in the usual way from coke and steam, is similarly subjected to liquefaction and separation, after suitable purification, and is thereby separated into approximately equal volumes of hydrogen and carbon monoxid. The hydrogen, after suitable purification, is supplied to the synthetic ammonia process where it is combined with the nitrogen resulting from the liquefaction of air. The carbon monoxid is in part burned with the oxygen from the liquefaction of the air and with further amounts of air to supply the high content carbon dioxid gases for the carbonating operation, while the excess carbon monoxid is available for use as fuel or for the production of power. The high content carbon dioxid gases thus produced can be combined with the carbon dioxid resulting from the calcination of the sodium bicarbonate and thereby further enriched before their passage to the carbonating towers.

The invention will be further described in connection with the accompanying drawing which illustrates, in a diagrammatic manner, the various reactions and steps of the process. In this diagrammatic illustration the spaces indicating the various gases, are approximately proportional to the respective gas volumes. Approximately five volumes of air, indicated at 1 are subjected to liquefaction and separation in the gas liquefying and separating machine A. The air is thus separated into approximately four volumes of nitrogen indicated at 8, and one volume of oxygen indicated at 6. It will be understood that, in practice, the air is preliminarily purified, and that some small amount of nitrogen may accompany the oxygen, but it is desirable that the nitrogen should be as free as possible from oxygen. The liquefaction apparatus will, as usual, be arranged with the proper heat interchangers so that the power used in liquefaction is largely regained in the cooling of the incoming air. The nitrogen separated from the air is made use of in the catalytic apparatus B, in conjunction with hydrogen for the production of synthetic ammonia.

Water gas, produced from coke and steam in the usual way, is indicated at 3, the amount being 24 volumes of which approximately 12 volumes is hydrogen and 12 volumes carbon monoxid. This water gas is subjected to liquefaction and separation in the liquefying apparatus A'. The liquefaction apparatus is operated in stages, so that moisture and carbon dioxid are first removed, together with most of the impurities, such as sulfur compounds, which if not removed would injure the catalyst in the catalytic apparatus B. The liquefaction and separation of the water gas results in the production of approximately 12 volumes of hydrogen, indicated at 7, and 12 volumes of carbon monoxid, indicated at 4. The hydrogen, if it contains any objectionable impurities, should be further purified, in any well-known way, and is then passed to the catalytic chamber B where it is caused to react with the nitrogen to form a synthetic ammonia, in the presence of a suitable catalyst and at an appropriate temperature and pressure. The ammonia is separated in liquid form or by absorption in water or in some other way, and the unchanged nitrogen and hydrogen are returned again to the catalytic compartment B. The synthetic ammonia formed, theoretically amounting to 8 volumes, is indicated at 9. This ammonia is supplied to the ammonia-soda process to form the ammoniacal brine in the brine carbonating towers D, D' and D''.

Part of the carbon dioxid required in the ammonia-soda process is supplied by calcination of the sodium bicarbonate to form soda ash. For this reason it is necessary to supply only sufficient additional carbon dioxid to make up that necessary for the carbonation. This carbon dioxid is supplied by combustion of a part of the carbon monoxid obtained from the water gas, approximately 4 volumes being used for this purpose, when an equal volume is obtained from the calcination operation resulting in the production of the soda ash. This combustion of a part of the carbon monoxid is effected with the use of the oxygen obtained from the air liquefying and separating apparatus, together with such further amounts of air as are required for the combustion. Four volumes of carbon monoxid will thus combine with one volume of oxygen and with the oxygen of five volumes of air, indicated at 2, to form approximately 8 volumes of carbon dioxid of 50% concentration indicated at 11. The combustion of the carbon monoxid can advantageously be effected in a suitable combustion engine or apparatus such as that indicated conventionally at C, thus supplying power which is available for use in the carrying out of the process. The carbon dioxid thus obtained, and which is of high carbon dioxid content, is combined with the carbon dioxid from the calcination furnace F and is passed to the carbonating towers D, D' and D''. From the brine carbonating towers the residual unabsorbed gas may be passed into the air at 12 but it is preferably washed free from ammonia gas by the use of a small amount of fresh brine. This gas is of high nitrogen content, usually over 90% nitrogen, and it can be used, after such further purification as may be necessary, in the manufacture of synthetic ammonia by combining it with the nitrogen coming from the liquefaction apparatus A.

In the operation of the carbonators D, D' and D", the ammoniacal brine may be produced from a suitable natural brine, which should be nearly free from calcium, magnesium and iron salts, and which should contain from 295 to 310 grams sodium chlorid per liter. The brine is nearly saturated with ammonia, usually at about 68 to 75° C., and the brine should contain about 60 to 70 grams of ammonia per liter. The volume of the original brine is somewhat increased by the introduction of the ammonia. The ammoniacal brine is cooled to about 25 to 30° C. before treatment with the carbon dioxid. The carbon dioxid gas, produced as above described, and which is relatively rich in carbon dioxid, is pumped into the carbonating towers under pressure. The carbonating towers may be of the usual construction so that the gas will be caused to bubble through the brine from section to section of the apparatus, and thereby brought into intimate contact with it. The carbonating towers may thus be of the type employed for scrubbing or cleaning gases, that is, tall towers constructed in sections with the gas bubbling through the brine in each section. The utilization of a carbonating gas rich in carbon dioxid has the advantages above mentioned, very materially increasing the rapidity of the reaction and the capacity of the apparatus, as well as the degree of the reaction, etc. The carbonating towers are operated at a working temperature of about 29 to 30° C., to give a crystalline sodium bicarbonate which is easily filtered. Lower temperatures tend to give a finer grained bicarbonate which is more difficult to filter.

The reaction which goes on in the carbonating towers results in the production of sodium bicarbonate and ammonium chlorid, the sodium bicarbonate separating out in crystalline form while the ammonium chlorid remains in solution. The sodium bicarbonate can be filtered on a continuous rotary type of filter, indicated at E, then rinsed with a small quantity of water to remove contaminating ammonium chlorid and excess sodium chlorid, and the resulting damp sodium bicarbonate can then be fed directly into the calcining apparatus F in which the soda ash is formed and carbon dioxid set free for further use in the process. Where the sodium bicarbonate is itself to form the final product, the calcination will be omitted and a correspondingly larger amount of carbon dioxid must be otherwise supplied. When the bicarbonate is to be calcined, this can advantageously be carried out in a closed rotating iron drum, so that the carbon dioxid set free may be collected and recovered from the calciners in a nearly pure state. When this carbon dioxid is combined with the 50% carbon dioxid indicated at 11 the concentration of carbon dioxid is correspondingly increased.

The aqueous solution from which the solid sodium bicarbonate has been filtered is then heated or "distilled," in the still G, in order to break up the ammonium bicarbonate and distil over the ammonia together with the slight excess of free ammonia normally present, and this ammonia is returned to the process. The solution which now contains the ammonium chlorid, can be further treated, by evaporation, for the separation of the ammonium chlorid therefrom, and the ammonium chlorid thus recovered in a solid form.

By operating in the manner described, the burning of lime for the production of carbon dioxid is unnecessary, nor is lime required for treatment of the ammonium chlorid produced by the process for the recovery of the ammonia therefrom. The ammonia is supplied in the form of synthetic ammonia, and the ammonia is obtained at the end of the process in the form of ammonium chlorid, the chlorin of the brine being thus used to fix the ammonia from the synthetic ammonia process.

So also, the water gas employed, after separation by liquefaction, is made use of in the process, the hydrogen, after suitable purification, being used for making synthetic ammonia, and the carbon monoxid being used for the generation of power and for producing a part of the carbon dioxid required in the operation. The burning of part of the carbon dioxid with the oxygen separated from air by liquefaction gives a much hotter flame than with air alone, and this heat can be utilized in calcining the bicarbonate, to make a fine quality of dense soda ash, or the combustion can be otherwise taken advantage of. A considerable amount of carbon monoxid, indicated at 5 in the drawing, is available for fuel or power purposes, thereby supplying part of the power necessary for the process, for example, in the liquefaction operation. The combustion of the carbon monoxid, with the enriched mixture of air and oxygen, for the production of the carbon dioxid required in the process, can be effected in a combustion engine or under boilers or otherwise, care being taken to cool the resulting gas to about 30° C. before passing it into the carbonating towers.

The utilization of a carbonating gas rich in carbon dioxid likewise results in a reduction of the power required for its compression, as well as a more rapid absorption in the brine, or equal rate of absorption with the use of lower pressures. The carbonating towers may thus be decreased in size or, for apparatus of a given size, the capacity will be materially increased.

Inasmuch as lime is not required for recovery of the ammonia, and inasmuch as carbon dioxid from the lime kilns is not required, these lime kilns are made unnecessary by the present invention. The ammonia is continually supplied to the process and fixed as ammonium chlorid which is obtained in a solid form by evaporation. This evaporation can with advantage be effected in multiple effect evaporators followed by crystallization of the ammonium chlorid from the hot concentrated solution.

I claim:

1. The improvement in the ammonia-soda process, which comprises subjecting water gas to liquefaction for the separation of hydrogen and carbon monoxid therefrom, subjecting air to liquefaction for the separation of nitrogen and oxygen therefrom, combining the nitrogen of the air with the hydrogen of the water gas to form synthetic ammonia, absorbing the ammonia in a brine solution to form an ammoniacal brine adapted for the ammonia-soda process, burning a part of the carbon monoxid of the water gas with the oxygen from the air and with further amounts of air to form a gaseous mixture rich in carbon dioxid, and supplying the resulting carbon dioxid to the carbonating towers of the ammonia-soda process.

2. The improvement in the ammonia-soda process, which comprises subjecting water gas to liquefaction for the separation of hydrogen and carbon monoxid therefrom, subjecting air to liquefaction for the separation of nitrogen and oxygen therefrom, combining the nitrogen of the air with the hydrogen of the water gas to form synthetic ammonia, absorbing the ammonia in a brine solution to form an ammoniacal brine adapted for the ammonia-soda process, burning a part of the carbon monoxid of the water gas with the oxygen from the air and with further amounts of air to form a gaseous mixture rich in carbon dioxid, and supplying the resulting carbon dioxid, together with further amounts of carbon dioxid from the calcination of the sodium bicarbonate resulting from the process, to the carbonating towers of the ammonia-soda process.

3. The improvement in the ammonia-soda process, which comprises separating water gas into hydrogen and carbon monoxid, producing synthetic ammonia by combining the hydrogen with nitrogen, absorbing the ammonia in a brine solution adapted for use in the ammonia-soda process, burning the carbon monoxid from the water gas with a combustion supporting gas rich in oxygen, and thereby forming a gaseous mixture rich in carbon dioxid, and supplying the resulting gas to the carbonating towers of the ammonia-soda process.

4. The improvement in the ammonia-soda process, which comprises separating water gas into hydrogen and carbon monoxid, separating air into nitrogen and a gas rich in oxygen, producing ammonia from the hydrogen of the water gas and the nitrogen of the air, absorbing the ammonia in a brine solution adapted for use in the ammonia-soda process, burning the carbon monoxid of the water gas with the utilization for the combustion of the gas rich in oxygen separated from the air and thereby forming a gaseous mixture rich in carbon dioxid, and supplying the resulting gas to the carbonating towers of the ammonia-soda process.

In testimony whereof I affix my signature.

JAMES H. MacMAHON.